(12) United States Patent
Endo (10) Patent No.: US 10,084,350 B2
(45) Date of Patent: Sep. 25, 2018

(54) WIRELESS POWER TRANSMISSION SYSTEM AND METHOD

(75) Inventor: Hideto Endo, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 683 days.

(21) Appl. No.: 14/404,535

(22) PCT Filed: May 29, 2012

(86) PCT No.: PCT/JP2012/063798
§ 371 (c)(1),
(2), (4) Date: Dec. 4, 2014

(87) PCT Pub. No.: WO2013/179394
PCT Pub. Date: Dec. 5, 2013

(65) Prior Publication Data
US 2015/0162752 A1 Jun. 11, 2015

(51) Int. Cl.
| | |
|---|---|
| *H02J 50/00* | (2016.01) |
| *H02J 50/60* | (2016.01) |
| *H02J 50/10* | (2016.01) |
| *B60L 11/18* | (2006.01) |
| *H02J 5/00* | (2016.01) |
| *H02J 7/02* | (2016.01) |

(52) U.S. Cl.
CPC ............ *H02J 50/60* (2016.02); *B60L 11/182* (2013.01); *B60L 11/1833* (2013.01);
(Continued)

(58) Field of Classification Search
CPC ............... B60L 11/182; B60L 11/1833; B60L 11/1835; B60L 2250/10; B60L 2270/147;
(Continued)

(56) References Cited

U.S. PATENT DOCUMENTS 6,028,413 A * 2/2000 Brockmann ............ H02J 7/025
320/108
9,203,244 B2 12/2015 Abe
(Continued)

FOREIGN PATENT DOCUMENTS

| EP | 2455253 | 5/2012 |
| JP | 2010-213414 | 9/2010 |
| JP | 2011211874 A | 10/2011 |

OTHER PUBLICATIONS

International Search Report, PCT/JP2012/063798, dated Aug. 7, 2012.

*Primary Examiner* — Rexford Barnie
*Assistant Examiner* — Elim Ortiz
(74) *Attorney, Agent, or Firm* — Young & Thompson (57) ABSTRACT

A wireless power transmission system (10) can perform power transmission in a wireless manner. The wireless power transmission system is provided with: a power transmission coil (11); a power supplying device (14) configured to supply electric power to the power transmission coil; a metal detecting device (13) configured to perform metal detection for detecting whether or not there is metal in surroundings of the power transmission coil; and a controlling device (12) configured to provide a power transmission period which is a period for the power transmission and a metal detection period which is a period for the metal detection, and to control the power supplying device to supply electric power, which is lower than electric power supplied to the power transmission coil in the power transmission period, or not to supply electric power, to the power transmission coil in the metal detection period.

1 Claim, 7 Drawing Sheets

(52) U.S. Cl.
CPC ........... *B60L 11/1835* (2013.01); *H02J 5/005* (2013.01); *H02J 7/025* (2013.01); *H02J 50/10* (2016.02); *B60L 2250/10* (2013.01); *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ....... H02J 5/005; H02J 7/025; Y02T 10/7005; Y02T 10/7072; Y02T 90/12; Y02T 90/121; Y02T 90/122; Y02T 90/125; Y02T 90/14
See application file for complete search history.

(56) References Cited

U.S. PATENT DOCUMENTS

| | | | |
|---|---|---|---|
| 2007/0216392 A1* | 9/2007 | Stevens | H02J 5/005 323/355 |
| 2007/0228833 A1* | 10/2007 | Stevens | H02J 5/005 307/45 |
| 2009/0001932 A1* | 1/2009 | Kamijo | H02J 5/005 320/108 |
| 2009/0015210 A1* | 1/2009 | Kojima | B60L 3/04 320/163 |
| 2009/0127936 A1* | 5/2009 | Kamijo | H02J 7/025 307/104 |
| 2009/0206791 A1* | 8/2009 | Jung | H02J 7/025 320/108 |
| 2010/0225173 A1 | 9/2010 | Aoyama et al. | |

* cited by examiner

WIRELESS POWER TRANSMISSION SYSTEM AND METHOD

TECHNICAL FIELD

The present invention relates to a wireless power transmission system and method which transmits electric power in a wireless manner to a power receiving apparatus disposed at a distance.

BACKGROUND ART

As this type of system, for example, there is proposed a system in which a power transmission period for power transmission and a communication period for signal transmission from a power receiving apparatus to a power transmission side are alternately provided, and in which transmitted power is weaken in the communication period in comparison with the power transmission period. Here, in particular, it is proposed to realize the stop of the power transmission corresponding to the detection of a foreign body by moving into a standby state if the communication has a time-out error (refer to Patent literature 1).

CITATION LIST

Patent Literature

Patent Literature 1: Japanese Patent Application Laid Open No. 2010-213414

SUMMARY OF INVENTION

Technical Problem

According to the aforementioned background art, however, the detection of a foreign body cannot be performed only by the system on the transmission side. Then, if there is a foreign body, it is hard to take a quick measure such as, for example, immediately stopping the power transmission, which is technically problematic. In particular, if the foreign body is a metal object, the metal object is heated by a magnetic field caused by the power transmission, which is also technically problematic.

It is therefore an object of the present invention to provide a power transmission system and method which can detect a foreign body containing metal and which can make a quick response if the foreign body is detected.

Solution to Problem

The above object of the present invention can be achieved by a wireless power transmission system configured to perform power transmission in a wireless manner by a method using an electromagnetic field, said wireless power transmission system is provided with: a power transmission coil; a power supplying device configured to supply electric power to the power transmission coil; a metal detecting device configured to perform metal detection for detecting whether or not there is metal in surroundings of the power transmission coil; and a controlling device configured to provide a power transmission period which is a period for the power transmission and a metal detection period which is a period for the metal detection, and to control the power supplying device to supply electric power, which is lower than electric power supplied to the power transmission coil in the power transmission period, or not to supply electric power, to the power transmission coil in the metal detection period, wherein the controlling device controls the power supplying device not to supply electric power to the power transmission coil under a condition that it is determined by the metal detecting device that there is metal in the surroundings of the power transmission coil.

The above object of the present invention can be achieved by a wireless power transmission method in a wireless power transmission system configured to perform power transmission in a wireless manner by a method using an electromagnetic field, said a wireless power transmission system provided with: a power transmission coil; a power supplying device configured to supply electric power to the power transmission coil; and a metal detecting device configured to perform metal detection for detecting whether or not there is metal in surroundings of the power transmission coil, said wireless power transmission method is provided with: a controlling process of providing a power transmission period which is a period for the power transmission and a metal detection period which is a period for the metal detection, and controlling the power supplying device to supply electric power, which is lower than electric power supplied to the power transmission coil in the power transmission period, or not to supply electric power, to the power transmission coil in the metal detection period, wherein the controlling process controls the power supplying device not to supply electric power to the power transmission coil under a condition that it is determined by the metal detecting device that there is metal in the surroundings of the power transmission coil.

The operation and other advantages of the present invention will become more apparent from embodiments and examples explained below.

DESCRIPTION OF EMBODIMENTS

Embodiments of the wireless power transmission system of the present invention will be explained.

The wireless power transmission system in an embodiment is a wireless power transmission system configured to perform power transmission in a wireless manner by a method using an electromagnetic field, said wireless power transmission system is provided with: a power transmission coil; a power supplying device configured to supply electric power to the power transmission coil; a metal detecting device configured to perform metal detection for detecting whether or not there is metal in surroundings of the power transmission coil; and a controlling device configured to provide a power transmission period which is a period for the power transmission and a metal detection period which is a period for the metal detection, and to control the power supplying device to supply electric power, which is lower than electric power supplied to the power transmission coil in the power transmission period, or not to supply electric power, to the power transmission coil in the metal detection period, wherein the controlling device controls the power supplying device not to supply electric power to the power transmission coil under a condition that it is determined by the metal detecting device that there is metal in the surroundings of the power transmission coil.

The wireless power transmission system is configured to perform the power transmission in the wireless manner by the method using an electromagnetic field, with respect to a power reception system. Specifically, the wireless power transmission system is configured such that the power transmission coil is disposed at a distance from a power reception coil of the power reception system, and such that alternating current power with a predetermined frequency is supplied to the power transmission coil to supply electric power from the power transmission coil to the power reception coil. Various known aspects can be applied to the power transmission, and thus, an explanation of the details thereof is omitted here.

The power supplying device is configured to supply electric power to the power transmission coil. The power supplying device may be provided with a power supply, or may be configured to obtain electric power from an exterior power supply. In any case, the power supplying device supplies electric power outputted from the power supply of the power supplying device, or electric power obtained from the exterior power supply, to the power transmission coil.

The metal detecting device, which is provided, for example, with a memory, a processor and the like, is configured to perform the metal detection for detecting whether or not there is metal in the surroundings of the power transmission coil. Here, the metal detection may be performed by using the fact that if metal is placed in a magnetic field, eddy current is generated in the metal, and by detecting a magnetic field generated in the surrounding of the metal due to the eddy current. Various known aspects can be applied to the metal detection, and thus, an explanation of the details thereof is omitted here.

The controlling device, which is provided, for example, with a memory, a processor and the like, provides the power transmission period which is a period for the power transmission and the metal detection period which is a period for the metal detection. The controlling device controls the power supplying device to supply relatively high electric power suitable for the power transmission, to the power transmission coil in the power transmission period. On the other hand, the metal detection is performed by the metal detecting device in the metal detection period.

Here, in particular, the controlling device controls the power supplying device to supply the electric power which is lower than the electric power supplied to the power transmission coil in the power transmission period, or not to supply electric power, to the power transmission coil in the metal detection period.

The wireless power transmission system performs the power transmission by the method using the electromagnetic field, as described above. Thus, the magnetic field generated in the surrounding of the power transmission coil due to the supply of electric power to the power transmission coil can be used for the metal detection (namely, the power transmission coil can be used as a part of the metal detecting device).

However, with the electric power suitable for the power transmission, the magnetic field generated in the surroundings of the power transmission coil becomes relatively strong, and there is thus a possibility that a relatively small metal piece cannot be detected. This is because a magnetic field generated in the surroundings of the metal piece due to eddy current in the metal piece hardly influences or does not influence at all the magnetic field generated in the surroundings of the power transmission coil due to the supply of electric power to the power transmission coil.

Thus, the controlling device is configured to control the power supplying device to supply the electric power which is lower than the electric power supplied to the power transmission coil in the power transmission coil, to the power transmission coil in the metal detection period, by which the magnetic field generated in the surroundings of the power transmission coil due to the supply of electric power to the power transmission coil is relatively weakened. As a result, it is possible to accurately perform the metal detection by using the power transmission coil as a part of the metal detecting device.

Alternatively, if the metal detecting device has its own apparatus configured to generate a magnetic field (e.g. a coil, etc.), the power supplying device is controlled by the controlling device not to supply electric power to the power transmission coil in the metal detection period. As a result, the power transmission coil does not generate a magnetic field, and thus, the metal detection can be accurately performed by the apparatus owned by the metal detecting device.

As a result, if there is metal in the magnetic field, eddy current is generated in the metal, as described above. Then, the metal is heated by the eddy current. If the power transmission is continued in the state in which there is metal in the surroundings of the power transmission coil, the wireless power transmission coil has a problem due to the heated metal.

Therefore, in the embodiment, the power supplying device is controlled by the controlling device not to supply electric power to the power transmission coil under the condition that it is determined by the metal detecting device that there is metal in the surroundings of the power transmission coil. It is thus possible to prevent that the wireless power transmission system is influenced by the metal which exists in the surrounding of the power transmission coil.

As a result, according to the wireless power transmission system in the embodiment, it is possible to detect a foreign body containing metal, and to make a quick response if the foreign body is detected.

In one aspect of the wireless power transmission system in the embodiment, the controlling device provides the power transmission period and the metal detection period, alternately and repeatedly.

According to this aspect, the metal detection is repeatedly performed, and it is thus possible to perform the power transmission, more safely, which is extremely useful in practice.

In another aspect of the wireless power transmission system in the embodiment, the controlling device controls the power supplying device to supply the electric power which is lower than the electric power supplied to the power transmission coil in the power transmission period, to the power transmission coil in the metal period, and the metal detecting device detects whether or not there is metal in the surroundings of the power transmission coil on the basis of a magnetic field generated in the surroundings of the power transmission coil.

According to this aspect, there is no need to separately provide an apparatus for generating a magnetic field for the metal detection, and it is thus possible to reduce, for example, manufacturing cost.

Alternatively, in another aspect of the wireless power transmission system in the embodiment, the metal detecting device comprises one or a plurality of coils for the metal detection, the controlling device controls the power supplying device not to supply electric power to the power transmission coil, and to supply electric power to the one or plurality of coils, in the metal detection period, and the metal detecting device detects whether or not there is metal in the surroundings of the power transmission coil on the basis of a magnetic field generated in surroundings of the one or plurality of coils.

According to this aspect, it is possible to perform the metal detection, relatively easily. In particular, if the metal detecting device has the plurality of coils, it is possible to specify not only the presence or absence of metal but also the position of the metal, which is extremely useful in practice.

In another aspect of the wireless power transmission system in the embodiment, said wireless power transmission system is further provided with a foreign body detecting device configured to detect a foreign body in the surroundings of the power transmission coil, and the controlling device changes to the metal detection period from the power transmission period under a condition that the foreign body is detected by the foreign body detecting device.

According to this aspect, the metal detection is performed only if the foreign body (containing other than metal) is detected, and it is thus possible to suppress a reduction in power transmission efficiency in comparison with a case where the power transmission is always stopped regularly even without an abnormality.

In this aspect, said wireless power transmission system can be further provided with a biodetecting device configured to detect a living body in the surroundings of the power transmission coil, the controlling device can change to the metal detection period from the power transmission period under the condition that the foreign body is detected by the foreign body detecting device, the biodetecting device can determine whether or not the foreign body detected by the foreign body detecting device is a living body in the metal detection period, and the controlling device can control the power supplying device not to supply electric power to the power transmission coil if it is determined that the detected foreign body is a living body.

By virtue of such a configuration, it is possible to prevent that the living body such as a human and an animal is influenced by the power transmission, which is extremely useful in practice.

The wireless power transmission method in an embodiment is a wireless power transmission method in a wireless power transmission system configured to perform power transmission in a wireless manner by a method using an electromagnetic field, said a wireless power transmission system provided with: a power transmission coil; a power supplying device configured to supply electric power to the power transmission coil; and a metal detecting device configured to perform metal detection for detecting whether or not there is metal in surroundings of the power transmission coil, said wireless power transmission method is provided with: a controlling process of providing a power transmission period which is a period for the power transmission and a metal detection period which is a period for the metal detection, and controlling the power supplying device to supply electric power, which is lower than electric power supplied to the power transmission coil in the power transmission period, or not to supply electric power, to the power transmission coil in the metal detection period, wherein the controlling process controls the power supplying device not to supply electric power to the power transmission coil under a condition that it is determined by the metal detecting device that there is metal in the surroundings of the power transmission coil.

According to the wireless power transmission method in the embodiment, as in the wireless power transmission system in the embodiment described above, it is possible to detect a foreign body containing metal, and to make a quick response if the foreign body is detected.

Even the wireless power transmission method in the embodiment can also adopt the same various aspects as those of the wireless power transmission system in the embodiment described above.

EXAMPLES

Examples of the wireless power transmission system of the present invention will be explained with reference to the drawings.

First Example

Figure 1:
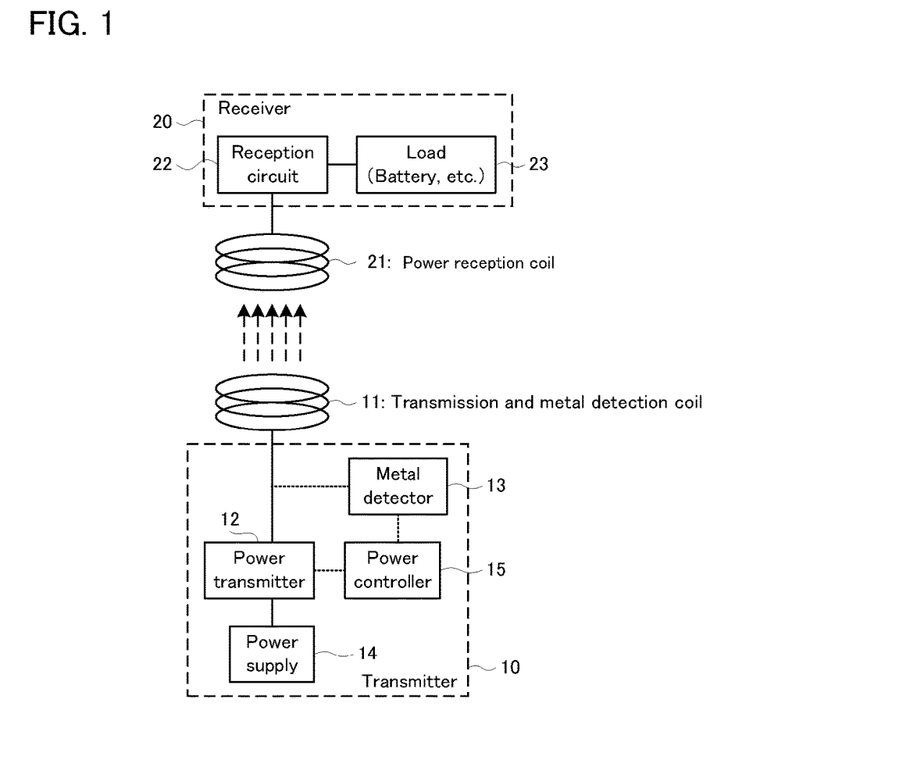
FIG. 1 is a block diagram illustrating a configuration of a power transmission system in a first example.
Figure 2:
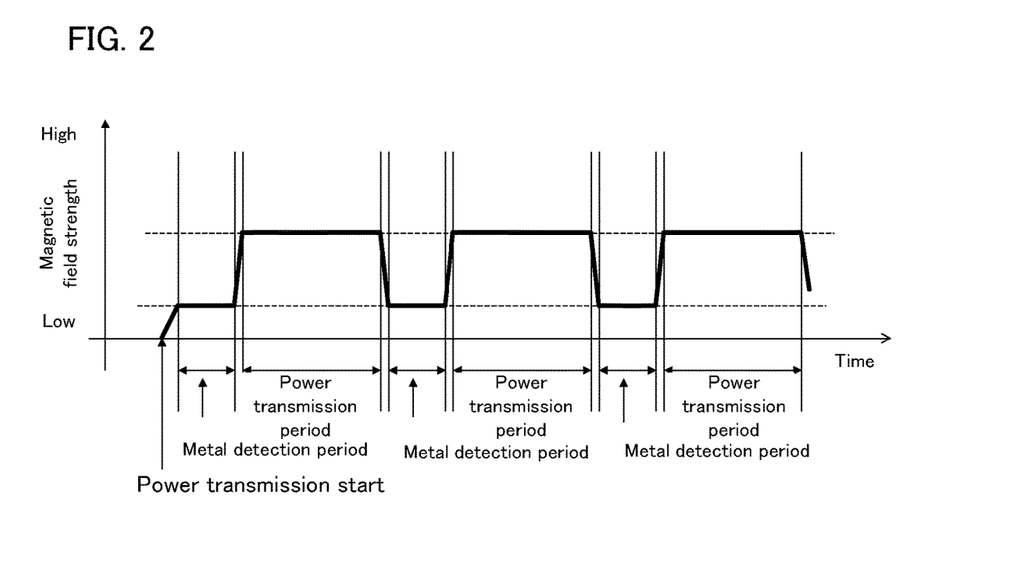
FIG. 2 is a diagram illustrating one example of a time change in magnetic field strength in the first example.

A first example of the wireless power transmission system of the present invention will be explained with reference to FIG. 1 and FIG. 2. FIG. 1 is a block diagram illustrating a configuration of the power transmission system in the first example. FIG. 1 is a block diagram illustrating a configuration of a power transmission system in the first example. FIG. 2 is a diagram illustrating one example of a time change in magnetic field strength in the first example.

In FIG. 1, a power transmission system 10 is provided with a power transmission and metal detection coil 11, a power transmitter 12, a metal detector 13, a power supply 14, and a power controller 15. The power controller 15 of the power transmission system 10 provides a power transmission period in which power transmission is performed, and a metal detection period in which metal detection is performed, alternately and repeatedly (refer to FIG. 2).

The "power transmission and metal detection coil 11", the "power controller 15", the "metal detector 13" and the "power supply 14" are one example of the "power transmission coil", the "controlling device", the "metal detecting device" and the "power supplying device" of the present invention, respectively.

A receiving apparatus 20 is provided with a power reception coil 21, a reception circuit 22 and a load 23. The receiving apparatus 20 is mounted on a vehicle such as, for example, an electric vehicle. In this case, the load 23 is, for example, a battery mounted on the vehicle, or the like.

If, for example, the power transmission is required from a user after the power transmission and metal detection coil 11 of the power transmission system 10 and the power reception coil 21 of the receiving apparatus 20 are disposed at a distance from each other, the power controller 15 firstly controls the power transmitter 12 to supply relatively low electric power for the metal detection to the power transmission and metal detection coil 11. As a result, a relatively weak magnetic field is generated in the surroundings of the power transmission and metal detection coil 11 (refer to FIG. 2), and the metal detector 13 thus uses the generated magnetic field to perform the metal detection.

As a result of the metal detection, if it is determined that there is no metal in the surroundings of the coil, the power controller 15 controls the power transmitter 12 to supply relatively high electric power suitable for the power transmission to the power transmission and metal detection coil 11. At this time, a relatively strong magnetic field according to supplied electric energy is generated in the surroundings of the power transmission and metal detection coil 11 (refer to FIG. 2).

The power controller 15 then controls the power transmitter 12 to set the metal detection period at a predetermined timing. After that, the power controller 15 controls the power transmitter 12 to repeat the power transmission period and the metal detection period, alternately.

As a result of the metal detection, if it is determined that there is metal in the surroundings of the coil, the power controller 15 controls the power transmitter 12 not to supply electric power to the power transmission and metal detection coil 11. In this case, the power transmission system 10 may be configured to inform the user of the detection of the metal.

Second Example

Figure 3:
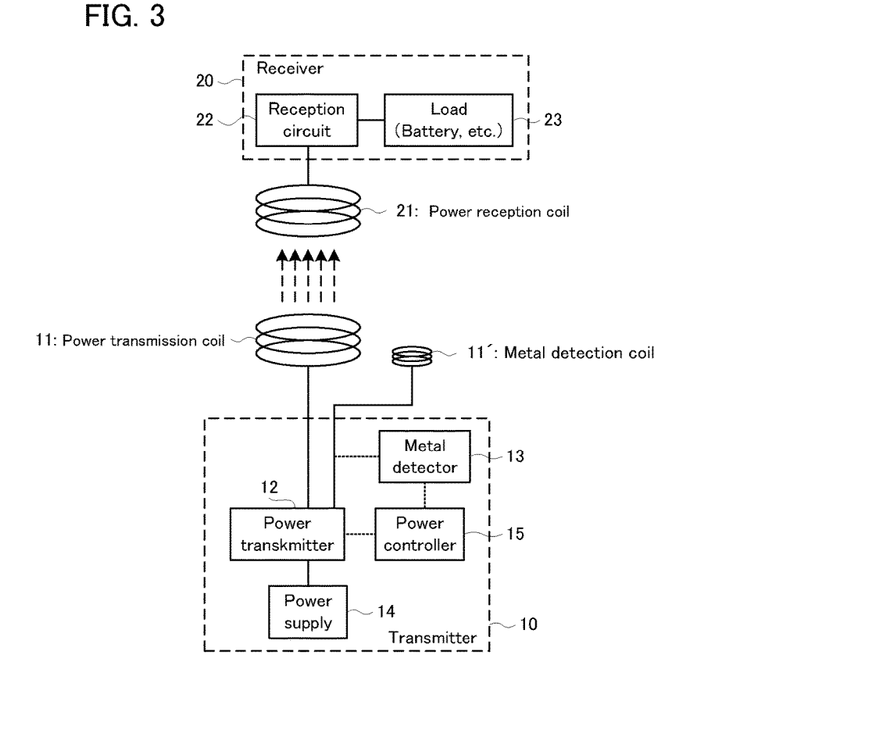
FIG. 3 is a block diagram illustrating a configuration of a power transmission system in a second example.
Figure 4:
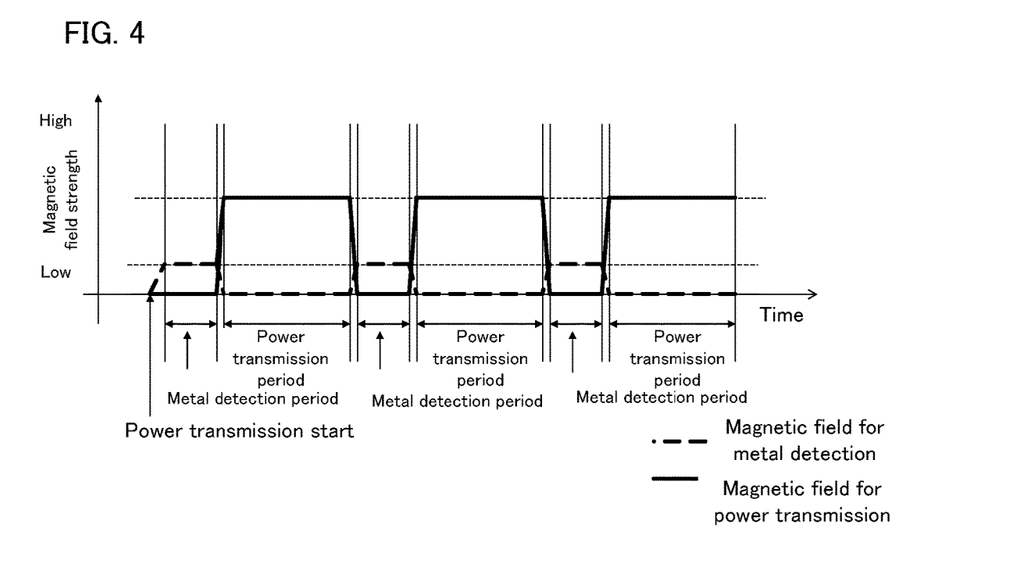
FIG. 4 is a diagram illustrating one example of a time change in magnetic field strength in the second example.

A second example of the wireless power transmission system of the present invention will be explained with reference to FIG. 3 and FIG. 4. FIG. 3 is a block diagram illustrating a configuration of the power transmission system in the second example, to the same effect as in FIG. 1. FIG. 4 is a diagram illustrating one example of a time change in magnetic field strength in the second example, to the same effect as in FIG. 2. The same members as those in the first example will carry the same reference numerals in the drawings. The same explanation as in the first example is also omitted, as occasion demands.

In FIG. 3, the power transmission system 10 is provided with a metal detection coil 11' as one example of the "coil" of the present invention, in addition to a power transmission coil 11, the power transmitter 12, the metal detector 13, the power supply 14 and the power controller 15. FIG. 3 illustrates one metal detection coil 11'; however, there may be provided a plurality of metal detection coils 11'.

The power controller 15 controls the power transmitter 12 to supply relatively low electric power for the metal detection to the metal detection coil 11' in the metal detection period. As a result, a relatively weak magnetic field is generated in the surroundings of the metal detection coil 11' (refer to a dashed line in FIG. 4), and the metal detector 13 thus uses the generated magnetic field to perform the metal detection. The power controller 15 further controls the power transmitter 12 not to supply electric power to the power transmission coil 11.

On the other hand, the power controller 15 controls the power transmitter 12 to supply relatively high electric power suitable for the power transmission to the power transmission 11. At this time, a relatively strong magnetic field according to supplied electric energy is generated in the surroundings of the power transmission coil 11 (refer to a solid line in FIG. 4). The power controller 15 further controls the power transmitter 12 not to supply electric power to the metal detection coil 11'.

Third Example

Figure 5:
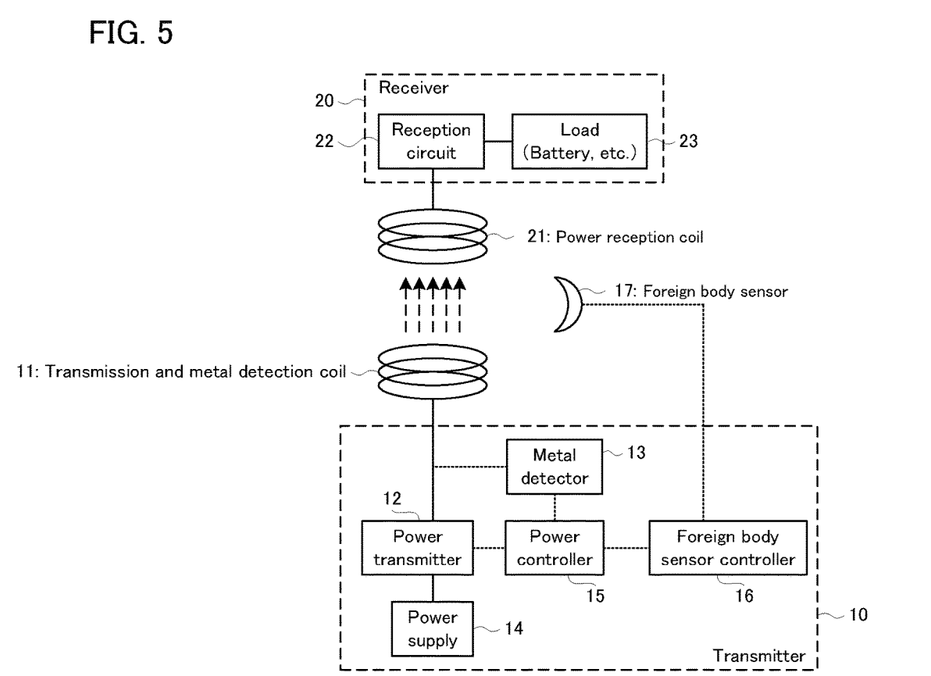
FIG. 5 is a block diagram illustrating a configuration of a power transmission system in a third example.
Figure 6:
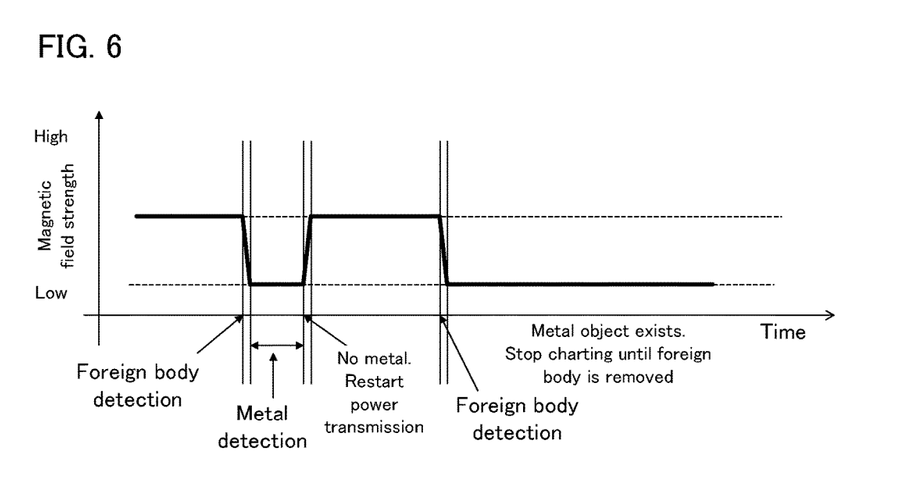
FIG. 6 is a diagram illustrating one example of a time change in magnetic field strength in the third example.

A third example of the wireless power transmission system of the present invention will be explained with reference to FIG. 5 to FIG. 7. FIG. 5 is a block diagram illustrating a configuration of the power transmission system in the third example, to the same effect in FIG. 1. FIG. 6 is a diagram illustrating one example of a time change in magnetic field strength in the third example, to the same effect as in FIG. 2. The same members as those in the first example will carry the same reference numerals in the drawings. The same explanation as in the first example is also omitted, as occasion demands.

In FIG. 5, the power transmission system 10 is provided with the power transmission and metal detection coil 11, the power transmitter 12, the metal detector 13, the power supply 14, the power controller 15, a foreign body sensor controller 16 and a foreign body sensor 17. Various known aspects such as, for example, a laser sensor and an ultrasonic sensor and camera can be applied to the foreign body sensor 17.

The foreign body sensor controller 16 determines whether or not there is a foreign body in the surroundings of the coil on the basis of an output signal from the foreign body sensor 17. The "foreign body sensor controller 16" and the "foreign body sensor 17" in the embodiment are one example of the "foreign body detecting device" of the present invention.

The power controller 15 controls the power transmitter 12 to supply relatively low electric power for the metal detection to the power transmission and metal detection coil 11, if it is determined by the foreign body sensor controller 16 that the there is a foreign body. As a result, a relatively weak magnetic field is generated in the surroundings of the power transmission and metal detection coil 11 (refer to FIG. 6), and the metal detector 13 thus uses the generated magnetic field to perform the metal detection.

As a result of the metal detection, if it is determined that the foreign body is metal, the power controller 15 controls the power transmitter 12 to continue the supply of the relatively low electric power to the power transmission and metal detection coil 11. Therefore, the metal detection is continued until the foreign body (metal) is removed from the surroundings of the coil (refer to FIG. 6).

A power transmission process performed by the power transmission system 10 as configured above will be explained with reference to a flowchart in FIG. 7.

Figure 7:
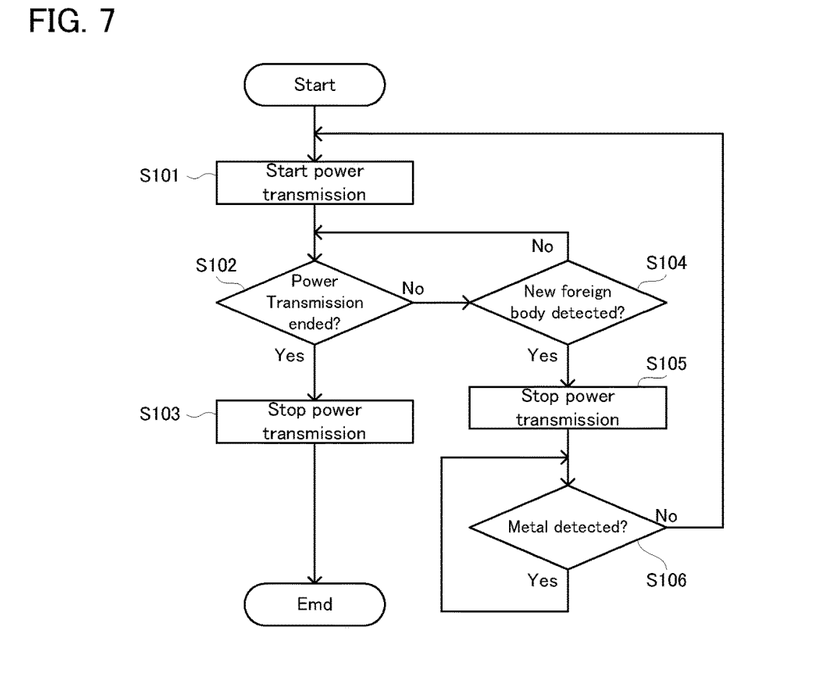
FIG. 7 is a flowchart illustrating a power transmission process in the third example.

In FIG. 7, firstly, the power controller 15 controls the power transmitter 12 to supply relatively high electric power suitable for the power transmission to the power transmission and metal detection coil 11 (step S101). The power controller 15 then determines whether or not the power transmission is ended (step S102). Whether or not the power transmission is ended may be determined, for example, by determining whether or not a signal indicating that the load 23 is in a predetermined charging state is received if the load 23 is a battery.

If it is determined that the power transmission is ended (the step S102: Yes), the power controller 15 controls the power transmitter 12 not to supply electric power to the power transmission and metal detection coil 11 (step S103). On the other hand, if it is determined that the power transmission is not ended (the step S102: No), the power controller 15 determines whether or not a signal indicating the presence of a foreign body is outputted from the foreign body sensor controller 16 (step S104).

If it is determined that the signal indicating the presence of a foreign body is not outputted (or a signal indicating the absence of a foreign body is outputted) (the step S104: No), the power controller 15 performs the process in the step S102.

If it is determined that the signal indicating the presence of a foreign body is outputted (the step S104: Yes), the power controller 15 controls the power transmitter 12 to supply relatively low electric power for the metal detection to the power transmission and metal detection coil 11 (step S105). As a result, the power transmission to the power receiving apparatus 20 from the power transmission system 10 is stopped.

The power controller 15 then determines whether or not metal is detected by the metal detector 13 (step S106). If it is determined that the metal is not detected (the step S106: No), the power controller 14 performs the process in the step S101. On the other hand, if it is determined that the metal is detected (the step S106: Yes), the power controller 15 performs the process in the step S106 again (i.e. repeats the process until metal is not detected).

Comparative Example

Figure 8:
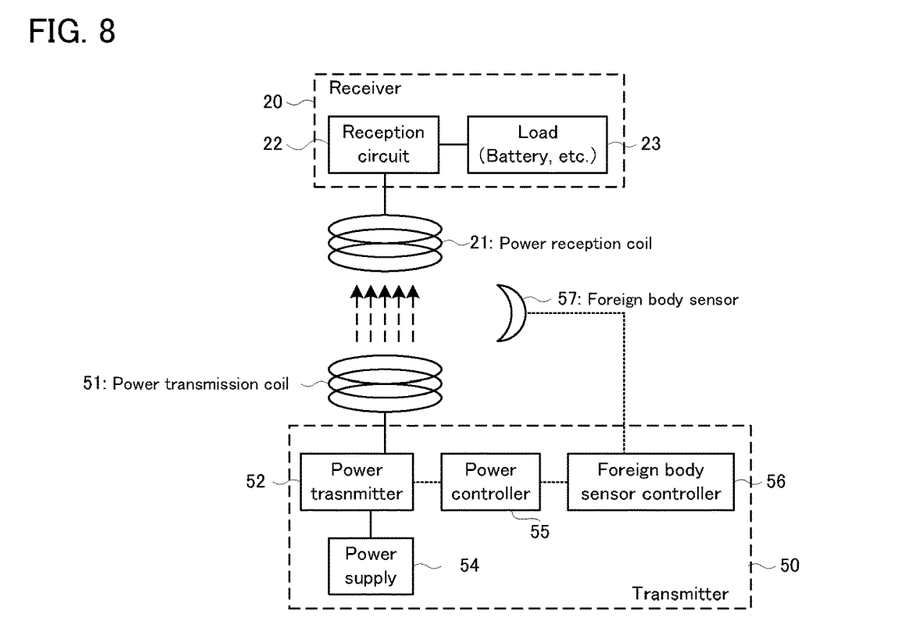
FIG. 8 is a block diagram illustrating a configuration of a power transmission system in a comparative example.

Now, a comparative example of the power transmission system 10 in the third example will be explained with reference to FIG. 8 and FIG. 9. FIG. 8 is a block diagram illustrating a configuration of the power transmission system in the comparative example.

In FIG. 8, a power transmission system 50 is provided with a power transmission coil 51, a power transmitter 52, a power supply 54, a power controller 55, a foreign body sensor controller 56 and a foreign body sensor 57. In other words, the metal detection is not performed in the power transmission system 50.

The operation of the power transmission system 50 will be explained with reference to a flowchart in FIG. 9.

Figure 9:
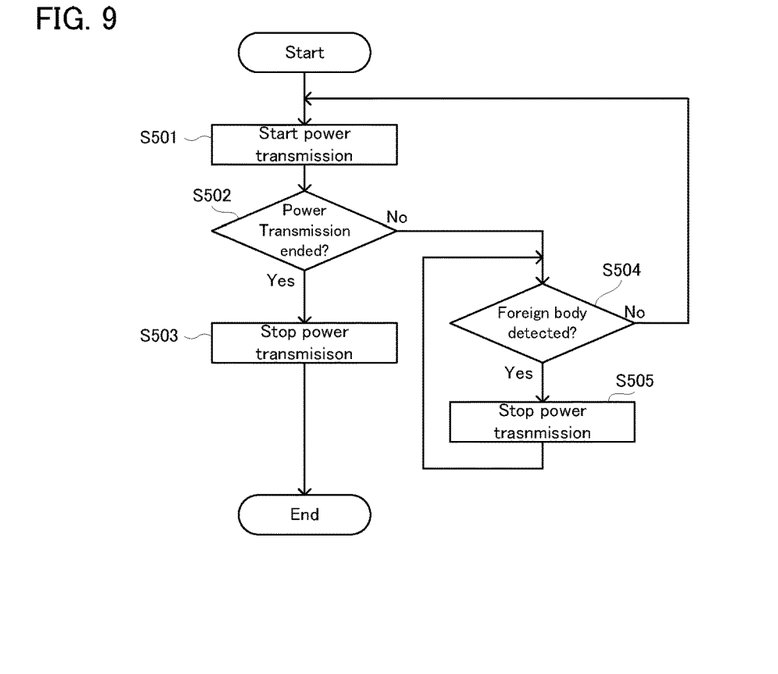
FIG. 9 is a flowchart illustrating a power transmission process in the comparative example.

In FIG. 9, firstly, the power controller 55 controls the power transmitter 52 to supply relatively high electric power suitable for the power transmission to the power transmission coil 51 (step S501). The power controller 55 then determines whether or not the power transmission is ended (step S502).

If it is determined that the power transmission is ended (the step S502: Yes), the power controller 55 controls the power transmitter 52 not to supply electric power to the power transmission coil 51 (step S503). On the other hand, if it is determined that the power transmission is not ended (the step S502: No), the power controller 55 determines whether or not a signal indicating the presence of a foreign body is outputted from the foreign body sensor controller 56 (step S504).

If it is determined that the signal indicating the presence of a foreign body is not outputted (the step S504: No), the power controller 55 performs the process in the step S502. If it is determined that the signal indicating the presence of a foreign body is outputted (the step S504: Yes), the power controller 55 controls the power transmitter 52 not to supply electric power to the power transmission coil 51 (step S505) and performs the process in the step S504.

As described above, in the power transmission system 50 in the comparative example, the power transmission is stopped if the foreign body is detected. The power transmission system 50 in the comparative example has no problem from the viewpoint of safety. The power transmission, however, is stopped even though the detected foreign body has no or little influence on the power transmission, and thus, power transmission efficiency is possibly reduced.

In contrast, in the power transmission system 10 in the third example, the power transmission is stopped only when the detected foreign body is the metal that influences the power transmission. It is therefore possible to suppress the reduction in power transmission efficiency while ensuring the safety.

Fourth Example

Figure 10:
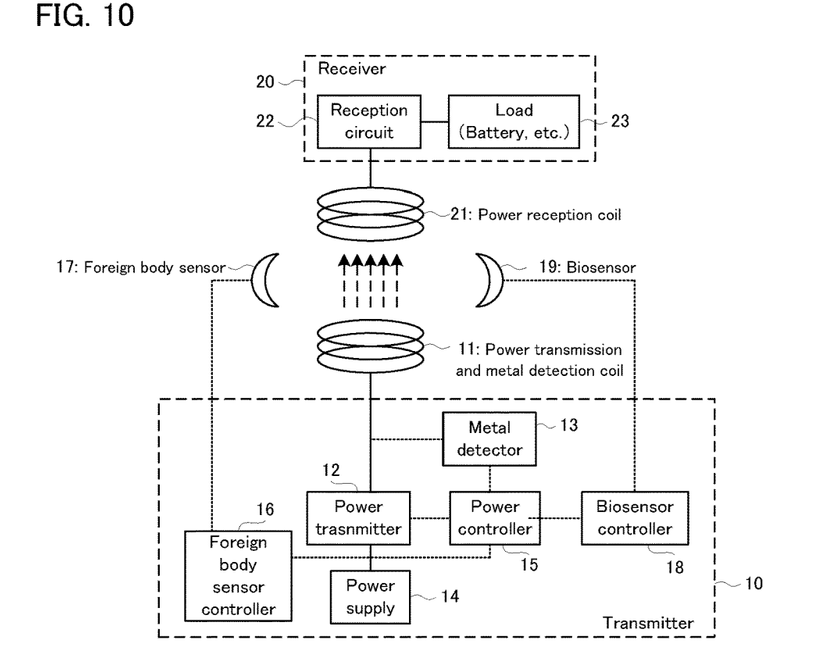
FIG. 10 is a block diagram illustrating a configuration of a power transmission system in a fourth example.

A fourth example of the wireless power transmission system of the present invention will be explained with reference to FIG. 10 and FIG. 11. FIG. 10 is a block diagram illustrating a configuration of the power transmission system in the fourth example, to the same effect as in FIG. 1. The same members as those in the first example will carry the same reference numerals in the drawings. The same explanation as in the first example is also omitted, as occasion demands.

In FIG. 10, the power transmission system 10 is provided with the power transmission and metal detection coil 11, the power transmitter 12, the metal detector 13, the power supply 14, the power controller 15, the foreign body sensor controller 16, the foreign body sensor 17, a biosensor controller 18 and a biosensor 19. Various known aspects such as, for example, an infrared sensor and camera can be applied to the biosensor 19.

The biosensor controller 18 performs biodetection for determining whether or not there is a living body such as a human and an animal in the surroundings of the coil on the basis of an output signal from the biosensor 19. The "biosensor controller 18" and the "biosensor 19" in the example are one example of the "biodetecting device" of the present invention.

If it is determined by the foreign body sensor controller 16 that there is a foreign body, the power controller 15 controls the power transmitter 12 to supply relatively low electric power for the metal detection to the power transmission and metal detection coil 11. Then, the metal detector 13 performs the metal detection, and the biosensor controller 18 performs the biodetection.

As a result of the metal detection, if it is determined that the foreign body is metal, the power controller 15 controls the power transmitter 12 to continue the supply of the relatively low electric power to the power transmission and metal detection coil 11. Therefore, the metal detection is continued until the foreign body (metal) is removed from the surroundings of the coil.

As a result of the biodetection, if it is determined that the foreign body is a living body, the power controller 15 controls the power transmitter 12 not to supply electric power to the power transmission and metal detection coil 11. As a result, the magnetic field is not generated in the surroundings of the power transmission and metal detection coil 11, and it is therefore possible to prevent that the living body is influenced by the magnetic field.

If it is determined that the foreign body is metal as a result of the metal detection and if it is determined that the foreign body is a living body as a result of the biodetection (e.g. if a human wearing shoes with metal fittings is detected as the foreign body), the power controller 15 may control the power transmitter 12 to supply minimal electric power which allows the metal detection to the power transmission and metal detection coil 11, or may control the power transmitter 12 not to supply electric power to the power transmission and metal detection coil 11.

A power transmission process performed by the power transmission system 10 as configured above will be explained with reference to a flowchart in FIG. 11.

Figure 11:
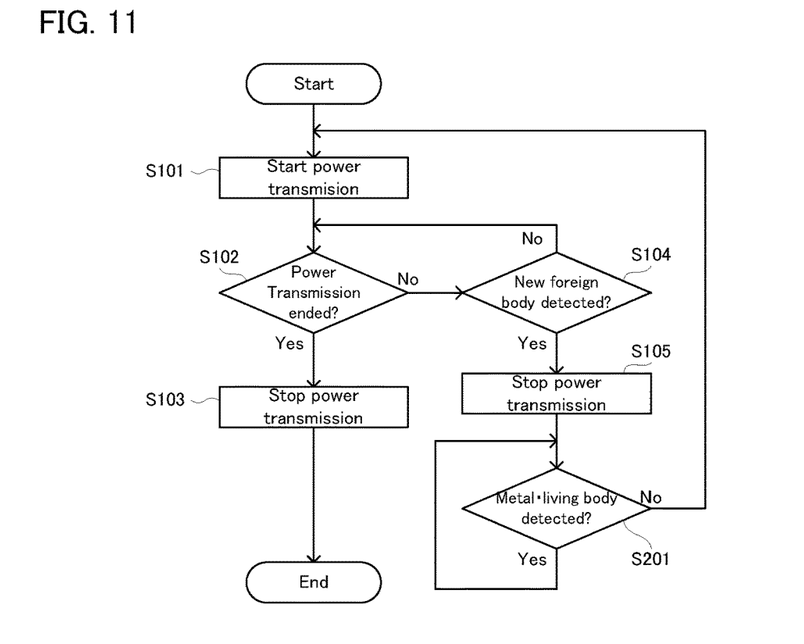
FIG. 11 is a flowchart illustrating a power transmission process in the fourth example.

In FIG. 11, after the process in the step S105, the power controller 15 determines whether or not metal is detected by the metal detector 13, and whether or not a signal indicating the presence of a living body is outputted form the biosensor controller 18 (step S201).

If it is determined that the metal is not detected, and if it is determined that the signal indicating the presence of a living body is not outputted (the step S201: No), the power controller 15 performs the process in the step S101.

On the other hand, if it is determined that the metal is detected, or if it is determined that the signal indicating the presence of a living body is outputted (the step S201: Yes), the power controller 15 performs the process in the step S201 again.

Fifth Example

Figure 12:
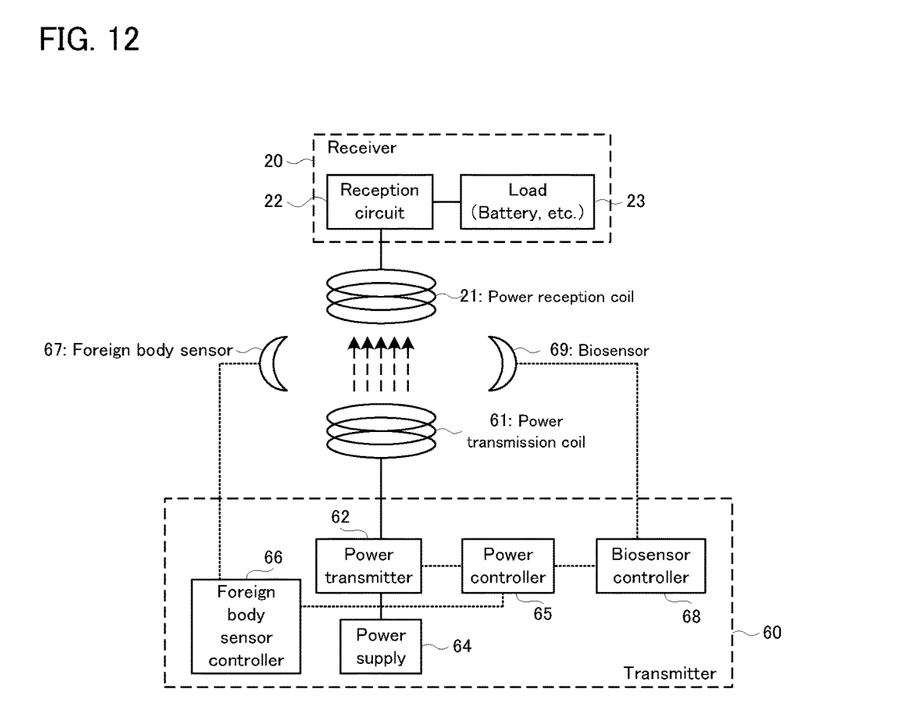
FIG. 12 is a block diagram illustrating a configuration of a power transmission system in a fifth example.

A fifth example of the wireless power transmission system of the present invention will be explained with reference to FIG. 12 and FIG. 13. FIG. 12 is a block diagram illustrating a configuration of the power transmission system in the fifth example, to the same effect as in FIG. 1. The same members as those in the first example will carry the same reference numerals in the drawings. The same explanation as in the first example is also omitted, as occasion demands.

In FIG. 12, a power transmission system 60 is provided with a power transmission coil 61, a power transmitter 62, a power supply 64, a power controller 65, a foreign body sensor controller 66, a foreign body sensor 67, a biosensor controller 68 and a biosensor 69. In the power transmission system 60, the metal detection is not performed.

If it is determined that there is a foreign body by the foreign body sensor controller 66, the power controller 65 controls the power transmitter 62 not to supply electric power to the power transmission coil 61. Then, the biosensor controller 68 performs the biodetection for determining whether or not there is a living body in the surroundings of the coil on the basis of an output signal from the biosensor 69.

As a result of the biodetection, if it is determined that the foreign body is a living body, the power controller 65 controls the power transmitter 62 not to supply electric power to the power transmission coil 61 until the living body is not detected. It is therefore possible to efficiently perform the power transmission while ensuring the safety to the living body.

A power transmission process performed by the power transmission system 60 as configured above will be explained with reference to a flowchart in FIG. 13.

Figure 13:
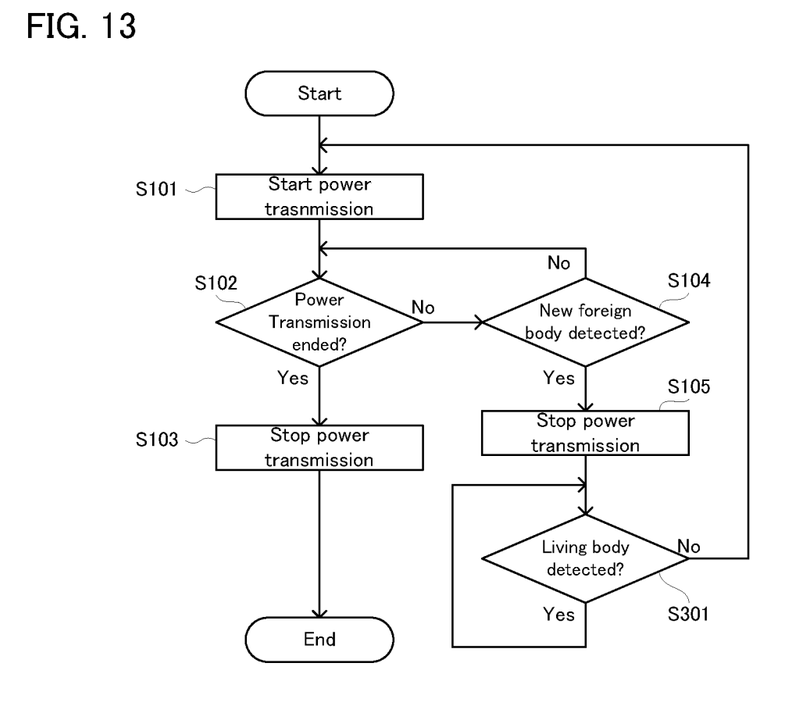
FIG. 13 is a flowchart illustrating a power transmission process in the fifth example.

In FIG. 13, after the process in the step S105, the power controller 65 determines whether or not a signal indicating the presence of a living body is outputted from the biosensor controller 68 (step S301). If it is determined that the signal indicating the presence of a living body is not outputted (the step S301: No), the power controller 64 performs the process in the step S101. On the other hand, if it is determined that the signal indicating the presence of a living body is outputted (the step S301: Yes), the power controller 65 performs the process in the step S301 again.

The present invention is not limited to the aforementioned embodiments and examples, but various changes may be made, if desired, without departing from the essence or spirit of the invention which can be read from the claims and the entire specification. A power transmission system and method which involves such changes is also intended to be within the technical scope of the present invention.

DESCRIPTION OF REFERENCE NUMERALS AND LETTERS

10, 50, 60 power transmission system
20 receiving apparatus
11 power transmission and metal detection coil
11' metal detection coil
12, 52, 62 power transmitter
13 metal detector
14, 54, 64 power supply
15, 55, 65 power controller
16 foreign body sensor controller
17 foreign body sensor
18 biosensor controller
19 biosensor
20 power receiving apparatus
21 power reception coil
22 reception circuit
23 load
51, 61 power transmission coil

The invention claimed is:

1. A wireless power transmission system configured to perform power transmission in a wireless manner by a method using an electromagnetic field, said wireless power transmission system comprising:
   a power transmission and metal detection coil;
   a power supplying device configured to supply electric power to the power transmission and metal detection coil;
   a metal detecting device configured to perform metal detection for detecting whether or not there is metal in surroundings of the power transmission and metal detection coil by using a magnetic field generated in the surroundings of the power transmission and metal detection coil;
   a controlling device configured to provide a power transmission period, which is a period for the power transmission, and a metal detection period, which is a period for the metal detection and is not executed simultaneously with the power transmission period, and further to control the power supplying device to supply electric power, which is lower than electric power supplied to the power transmission and metal detection coil in the power transmission period, to the power transmission coil in the metal detection period;
   a foreign body detecting device configured to detect a foreign body in the surroundings of the power transmission and metal detection coil; and
   a biodetecting device configured to detect a living body in the surroundings of the power transmission and metal detection coil,
   wherein:
   the controlling device controls the power supplying device not to supply electric power to the power transmission and metal detection coil under a condition that it is determined by the metal detecting device that there is metal in the surroundings of the power transmission and metal detection coil, the controlling device changes to the metal detection period from the power transmission period under a condition that the foreign body is detected by the foreign body detecting device, the biodetecting device determines whether or not the foreign body detected by the foreign body detecting device is a living body in the metal detection period, and the controlling device controls the power supplying device not to supply electric power to the power transmission and metal detection coil if it is determined that the detected foreign body is a living body.

* * * * *